(12) United States Patent
Baker et al.

(10) Patent No.: US 8,200,271 B2
(45) Date of Patent: Jun. 12, 2012

(54) TRANSMIT POWER CONTROL IN A RADIO STATION

(75) Inventors: Matthew P. J. Baker, Canterbury (GB); Timothy J. Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 471 days.

(21) Appl. No.: 12/158,704

(22) PCT Filed: Dec. 19, 2006

(86) PCT No.: PCT/IB2006/054954
§ 371 (c)(1),
(2), (4) Date: Jun. 23, 2008

(87) PCT Pub. No.: WO2007/072427
PCT Pub. Date: Jun. 28, 2007

(65) Prior Publication Data
US 2008/0274763 A1    Nov. 6, 2008

(30) Foreign Application Priority Data
Dec. 23, 2005 (EP) .................................... 05112914

(51) Int. Cl.
*H04B 7/00* (2006.01)
(52) U.S. Cl. ........... 455/522; 455/69; 455/70; 455/13.1; 370/318; 370/319; 370/320
(58) Field of Classification Search .................. 455/522, 455/69–70, 13.1; 370/318–320
See application file for complete search history.

(56) References Cited

U.S. PATENT DOCUMENTS

| | | | |
|---|---|---|---|
| 6,185,431 B1 | 2/2001 | Li et al. | |
| 6,876,866 B1 | 4/2005 | Ulupinar et al. | |
| 6,950,632 B1* | 9/2005 | Yun et al. | ......................... 455/69 |
| 2005/0124373 A1* | 6/2005 | Marinier | ........................ 455/522 |

FOREIGN PATENT DOCUMENTS

| | | |
|---|---|---|
| EP | 1039657 A1 | 9/2000 |
| WO | 02101941 A2 | 12/2002 |
| WO | 2006033059 A1 | 3/2006 |

OTHER PUBLICATIONS

Jad Nasreddine, et al: Adaptive Power Control Algorithm for 3G Cellular CDMA Networks, Vehicular Technology Conf. 2004, VTC 2004-Spring. 2004 IEEE 59th vol. 2, May 17-19, 2004, pp. 984-988.

* cited by examiner

Primary Examiner — Fayyaz Alam

(57) ABSTRACT

A radio station (100), transmits a continuous control signal and a discontinuous data signal simultaneously. It receives UP and DOWN power control commands and adjusts its transmit power by ● in response to the UP power control commands, increasing its transmit power by a power step, ● in response to the DOWN power control commands, decreasing its transmit power by a power step, ● in response to initiating transmission of the data signal, increasing the transmit power of the control signal, and ● in response to terminating transmission of the data signal, decreasing the transmit power of the control signal; In response to initiating or terminating transmission of the data signal, the radio station (100) temporarily modifies its response to the power control commands.

14 Claims, 1 Drawing Sheet

TRANSMIT POWER CONTROL IN A RADIO STATION

FIELD OF THE INVENTION

The invention relates to a radio station, a radio system comprising a radio station, a method of operating a radio station, and a method of operating a radio system comprising a radio station.

BACKGROUND OF THE INVENTION

In systems such as High Speed Uplink Packet Access (HSUPA) for UMTS (Universal Mobile Telecommunication System), mobile stations (MSs) transmit a control signal in parallel with a discontinuous data signal, the control signal continuing to be transmitted during the periods when the data signal is not transmitted.

The transmit power level of the control signal may be reduced during periods when data transmission is discontinued, which conserves power and reduces the average interference generated by the transmissions, and increased during at least some of each transmission period of the data signal to enable reliable reception of the control signal.

Systems such as UMTS use closed loop power control, whereby an MS's transmit power is adjusted by transmit power control (TPC) commands received from one or more base stations (BSs). The power control commands are typically generated at the BS(s) by means of comparing with a target level the Signal-to-Interference Ratio (SIR) of the control signal received from the UE, and generating a "down" command if the SIR is above the target level or an "up" command if the SIR is below the target level. Consequently, if it is desired to apply an increase to the transmit power level of the control signal when a data signal is transmitted, it is necessary also to raise the target SIR level in order to avoid any power step applied at the MS being cancelled out after a short period of time by the response to power control commands generated by the BS(s) using the previous SIR target level.

Ideally, an adjustment to the SIR target would be applied at the BS synchronously with each of the changes of control signal transmit power described above. This may be achievable if the BS can quickly detect when the change in control signal transmit power has been applied, for example by detecting the start of data transmission.

However, in practice, it may be difficult for the BS to detect when the change in control signal transmit power has been applied before the closed loop power control has cancelled out the change in control signal transmit power. For example, in UMTS the power control commands are transmitted every timeslot (0.666 ms). If, for example, a 3 dB change is applied to the control signal transmit power, and a 1 dB step is used for the inner loop power control, then the inner loop power control would have fully counteracted the change in the control signal transmit power within 3 timeslots. If the BS is to avoid any counteracting by the inner loop power control, it has less than 1 timeslot in which to detect the application of the increase in control signal transmit power.

SUMMARY OF THE INVENTION

An object of the invention is to provide improved power control.

According to a first aspect of the invention there is provided a method of operating a radio station, comprising:

transmitting a continuous control signal and a discontinuous data signal simultaneously;
receiving first and second transmit power control commands;
adjusting transmit power by
  in response to the first power control commands, increasing transmit power by a power step,
  in response to the second power control commands, decreasing transmit power by a power step,
further comprising, in response to initiating or terminating transmission of the data signal, temporarily modifying the response to the power control commands.

According to a second aspect of the invention there is provided a radio station, comprising:
a transmitter adapted to transmit a continuous control signal and a discontinuous data signal simultaneously;
a receiver adapted to receive first and second transmit power control commands; and
power control means adapted to adjust the transmit power of the transmitter by
  in response to the first power control commands, increasing transmit power by a power step,
  in response to the second power control commands, decreasing transmit power by a power step,
wherein the power control means is adapted, in response to initiation or termination of transmission of the data signal, temporarily to modify the response to the power control commands.

In one embodiment of the invention the modified response to the power control commands may comprise refraining from adjusting the transmit power in response to at least some of the power control commands.

In another embodiment of the invention the modified response to the power control commands comprises adjusting the transmit power by a power step of a different size.

BRIEF DESCRIPTION OF THE DRAWINGS

The invention will now be described, by way of example, with reference to the accompanying drawings wherein.

DETAILED DESCRIPTION OF PREFERRED EMBODIMENTS

Figure 1:
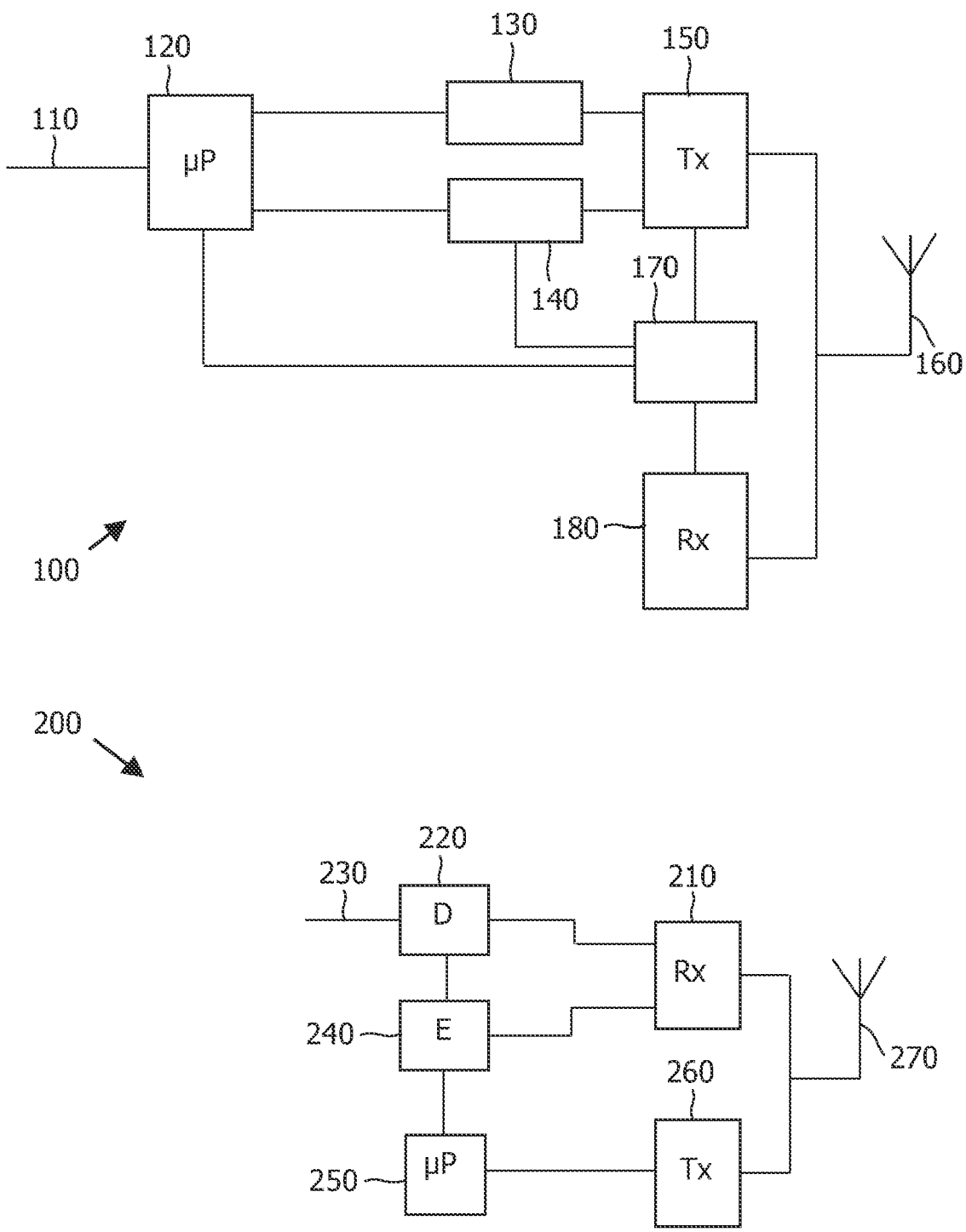
FIG. 1 is a block schematic diagram of a radio communication system comprising a data sending station and a data receiving station.

The invention will be described in relation to UMTS, with the data sending station being a mobile station (MS) and the data receiving station being a base station (BS). According to the present invention, the MS modifies the algorithm used to respond to power control commands for a certain time period after a change in control signal transmit power related to the start or end of transmission of the data signal.

The period for which the power control algorithm is modified may be predetermined or signalled to the MS by the BS. Signalling may also be used to enable/disable the MS's modification of the power control algorithm.

Different embodiments of the invention may involve different modifications to the power control algorithm.

In one embodiment, the modification comprises the MS ignoring certain closed loop power control commands during the said time period. This provides a time window for the BS to detect that transmission of the data signal has commenced and adjust the SIR target without the control signal power offset being counteracted by the inner loop power control.

The power control commands, which are ignored within the time period may be any of the following:

all power control commands received
only "up" commands
only "down" commands

The sign of the power control commands to be ignored may depend on the direction of the preceding change of transmit power of the control signal.

In one example of this embodiment, a MS usually adjusts the transmit power of its control signal once per timeslot in response to power control commands received from a BS. The MS applies an additional increase to the transmit power of its control signal when it starts transmitting a data signal, and applies an additional decrease to the transmit power of its control signal when it stops transmitting the data signal. According to this embodiment of the invention, the MS ignores "down" power control commands received in the first $n_1$ timeslots after applying the additional increase to the transmit power of its control signal. The MS keeps the transmit power of its control signal constant during this period.

In some variations of the embodiment, the MS may also ignore "up" power control commands received in the first $n_2$ timeslots after applying the additional decrease to the transmit power of its control signal.

In a further variation of this embodiment, the MS may ignore power control commands only until a command is received of the opposite sign to the commands, which are being ignored. Receiving a command of the opposite sign to the commands which are being ignored may be interpreted by the MS as an indication that the BS has successfully adjusted its SIR target. For example, after applying an increase to the transmit power of the control signal in response to starting to transmit the data signal, the MS may ignore "down" commands until the first "up" command is received. Note that in this case the signalling of the length of the time period is implicit in the power control commands themselves. As a further variation, the MS may ignore "down" commands until whichever is the sooner of receiving an "up" command and the elapsing of $n_1$ timeslots. Similarly, after applying a decrease to the transmit power of the control signal in response to ceasing to transmit the data signal, the MS may ignore "up" commands until the first "down" command is received, or until whichever is the sooner of receiving a "down" command and the elapsing of $n_2$ timeslots.

In a variation of any of the above embodiments, the BS may send an explicit signal to the MS to indicate that the MS should terminate the modification of the power control algorithm (implying that the SIR target has been adjusted).

In a second embodiment, the modification to the power control algorithm comprises switching between two predetermined power control algorithms, for example from an algorithm which responds at a first rate to power control commands to an algorithm which responds at a second rate to power control commands. For example, in UMTS two power control algorithms are provided: a first algorithm in which the MS responds to the power control command received in every timeslot, and a second algorithm whereby the MS only changes its transmit power if a number (5 in UMTS) of consecutive power control commands are received in the same direction. An MS which usually responds to power control commands using a first algorithm switches to responding using the second algorithm in the first $n_1$ timeslots after applying the additional increase to the transmit power of its control signal, before reverting to using the first algorithm.

The same methods of terminating the use of the second algorithm may be used as in the first embodiment.

In another embodiment, the modification to the power control algorithm comprises changing the power control step size (e.g. from 1 dB to 0.5 dB).

In variations of these embodiments, a property of the modification of the power control algorithm may be dependent on the magnitude of the change of transmit power applied to the control signal. For example, the rate of response to power control commands may be reduced by a larger amount if the magnitude of the change of transmit power of the control signal is smaller.

In any of these embodiments, the values of $n_1$ and $n_2$ may be the same, and may be signalled either together or separately. In some variations, $n_1$ and/or $n_2$ may be equal to the duration of the transmission of the data signal. In the case of the first embodiment, this would mean that the transmission power of the control signal (and possibly also the data signal) would remain constant for the duration of the transmission of the data signal. The value of $n_1$ is typically a compromise between a loss of efficiency arising from the modified operation of the closed loop power control and a gain of efficiency arising from the ability of the invention to prevent the power step applied to the control channel from being degraded by the action of the closed loop power control.

Referring to FIG. 1, there is illustrated a block schematic diagram of a radio communication system comprising a MS station 100 and a BS 200.

The MS 100 comprises a processor (µP) 120 coupled to an input 110 for receiving data to be transmitted in a data signal.

The processor 120 is adapted to subdivide the data into a plurality of data packets, encode the data packets for transmission, and control the time at which the data packets are transmitted. The processor 120 is coupled to a transmitter (Tx) 150 for transmission of the data signal via an antenna 160. The transmission of the data signal is discontinuous because, for example, the arrival of data at the input 110 is discontinuous, or because the MS 100 is granted permission to transmit data only during discontinuous time periods, or because of a need for the MS to prepare for handover. The data signal for transmission is supplied to the transmitter 150 from the processor 120 via a data signal power adjustment stage 130.

The processor 120 is also adapted to generate a control signal, for example a pilot signal comprising pre-determined symbols suitable for channel estimation by the BS, and is coupled to the transmitter 150 via a control signal power adjustment stage 140 which sets the transmit power level of the control signal. The control signal is transmitted continuously while the data signal is being transmitted and while transmission of the data signal is discontinued. The control signal power adjustment stage 140 is coupled to a power controller 170 for controlling the transmit power level of the control signal during data transmission, for which the level may depend on the transmission format of the data signal, and for controlling the transmit power level of the control signal while transmission of the data signal is discontinued. The power controller 170 is coupled to the processor 120 which informs it of when data is being transmitted.

The MS 100 comprises a receiver (Rx) 180 coupled to the antenna 160 for receiving TPC commands transmitted by the BS 200 for the purpose of closed loop transmit power control, and the power controller 170 is coupled to the receiver 180 for decoding the received TPC commands, and coupled to the transmitter 150 for adjusting the transmit power level of the control signal and the data signal in accordance with the received TPC commands. The closed loop transmit power control is superimposed on the changes in transmit power level introduced by the control signal power adjustment stage 140.

The power controller 170 may be coupled to the transmitter 150 also for controlling the power step size to be used when adjusting the transmit power in response to the TPC commands, as herein described.

The power controller 170 is adapted to control the transmit power as herein described.

The BS 200 comprises a receiver (Rx) 210 coupled to an antenna 270 for receiving the control signal and data signal transmitted by the MS 100. Coupled to the receiver 210 is a data demodulator (D) 220 for demodulating the received data signal and delivering the demodulated data on an output 230.

Coupled to the receiver 210 is an estimation means (E) 240 for performing channel estimation on, for example, received pilot symbols of the control signal. An output of the estimation means 240 may be coupled to the data demodulator 220 to enable the result of channel estimation to be used in demodulating the data, for example, to enable the data demodulator 220 to generate a phase reference or to perform equalisation.

The BS 200 comprises a processor (μP) 250, which is coupled to an output of the estimation means 240 for generating TPC commands, and is coupled to a transmitter (Tx) 260 for transmitting the TPC commands to the first station 100 via the antenna 270. In order to generate TPC commands, the estimation means 240 measures a parameter of the received control signal, for example SIR or SNR, and compares the value of the measured parameter with a target value. When the transmit power level of the control signal is temporarily increased by the MS 100 for the duration of the data transmission, without further measures at the BS 200 the TPC commands would tend to restore the transmit power level of the MS 100. Therefore, the processor 250, temporarily increases the target value of the measured parameter by a corresponding amount, which may depend on the transmission format of the data signal, for the period during which the transmit power level of the control signal is temporarily increased.

Although the invention has been described with reference to UMTS, the invention may be used in other wireless communication systems, for example cdma2000.

In the present specification and claims the word "a" or "an" preceding an element does not exclude the presence of a plurality of such elements. Further, the word "comprising" does not exclude the presence of other elements or steps than those listed. The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communications and which may be used instead of or in addition to features already described herein.

The invention claimed is:

1. A method of operating a radio station, comprising:
    transmitting a continuous control signal and a discontinuous data signal;
    receiving first and second transmit power control commands;
    adjusting a transmit power level of the continuous control signal by, in response to the first power control commands, increasing the transmit power level by a power step, and in response to the second power control commands, decreasing the transmit power level by the power step, and
    in response to initiating or terminating transmission of the data signal, temporarily modifying the response to the first or second power control commands for a predetermined period of time or for a period signaled from a base station.

2. The method as claimed in claim 1, wherein said method further comprises the step of:
    changing the transmit power level of the control signal when initiating or terminating transmission of the data signal,
    and wherein the response to the power control commands is modified as a function of the magnitude or direction of the transmit power level change.

3. The method as claimed in claim 1, wherein the modified response to the power control commands comprises refraining from adjusting the transmit power level in response to at least some of the power control commands.

4. The method as claimed in claim 3, wherein the modified response to the power control commands comprises refraining from adjusting the transmit power level in response at least to the first power control commands when terminating transmission of the data signal.

5. The method as claimed in claim 4, wherein the modified response to the power control commands comprises refraining from adjusting the transmit power level in response at least to the second power control commands when initiating transmission of the data signal.

6. The method as claimed in claim 3, wherein said method further comprises the step of:
    ceasing to refrain from adjusting the transmit power level in response to at least some of the power control commands when receiving a power control command having an opposite sign from the sign of the at least some of the power control commands.

7. The method as claimed in claim 1, wherein the modified response to the power control commands comprises adjusting the transmit power level by a power step of a different size.

8. The method as claimed in claim 7, wherein the modified response to the power control commands comprises using a lower power step size in response to at least some of the first power control commands when terminating transmission of the data signal.

9. The method as claimed in claim 8, wherein the modified response to the power control commands comprises using a lower power step size in response to at least some of the second power control commands when initiating transmission of the data signal.

10. The method as claimed in claim 1, wherein adjusting the transmit power level occurs at a first rate, and wherein the modified response comprises responding at a second rate, different from the first rate.

11. The method as claimed in claim 1, wherein said method further comprises the step of:
    ceasing to modify the response to the power control commands only after a predetermined number of timeslots.

12. A radio station, comprising:
    a transmitter for transmitting a continuous control signal and a discontinuous data signal simultaneously;
    a receiver for receiving first and second transmit power control commands; and
    power control means for adjusting the transmit power level of the continuous control signal by, in response to the first power control commands, increasing the transmit power level by a power step, and in response to the second power control commands, decreasing the transmit power level by the power step,
    wherein the power control means, in response to initiation or termination of transmission of the data signal, temporarily modifies the response to the first or second power control commands for a predetermined period of time or for a period signaled from a base station.

13. The radio station as claimed in claim 12, wherein the modified response to the power control commands comprises the power control means refraining from adjusting the transmit power level in response to at least some of the power control commands.

14. The radio station as claimed in claim 12, wherein the modified response to the power control commands comprises the power control means adjusting the transmit power by a different size power step.

* * * * *